Figure 1:
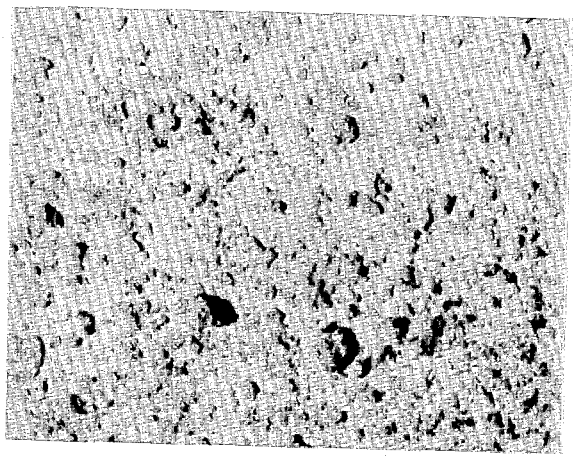

April 29, 1952  H. L. POWERS ET AL  2,594,345
MANUFACTURE OF LINOLEUM CEMENT
Filed June 22, 1948

Patented Apr. 29, 1952

2,594,345

UNITED STATES PATENT OFFICE 2,594,345

MANUFACTURE OF LINOLEUM CEMENT

Henry L. Powers and Harold A. Reehling, Lancaster, Pa., assignors to Armstrong Cork Company, Lancaster, Pa., a corporation of Pennsylvania Application June 22, 1948, Serial No. 34,458

11 Claims. (Cl. 106—228)

This invention relates to the manufacture of linoleum. More particularly, the invention relates to an improved linoleum cement and method of making the same, which cement may be employed in a continuous process for the manufacture of linoleum type material which may be used as floor and wall coverings.

Linoleum is a well-known article of manufacture and is generally prepared by calendering or otherwise impressing a mass of plastic material upon a suitable backing which is generally burlap or similar woven fabric or which may be an asphalt impregnated felt. The mass, known as linoleum mix, is obtained by mixing a binder, known in the art as linoleum cement, with mineral and organic fillers, coloring pigment, and other ingredients. Generally speaking linoleum cements are produced by heating a drying oil, generally linseed oil, and combining the drying oil with a resin, generally rosin.

There are several well-known methods of obtaining a linoleum cement. One of these methods involves boiling the drying oil with a drier such as litharge, and thereafter flowing the resulting oil over a strip of cloth, known as scrim cloth, and allowing the oil to become oxidized by exposure to air in a shed maintained at slightly elevated temperatures. This oil is known as "scrim oil" or "shed oil" and after oxidation by air for a sufficient period of time is mixed with rosin or other similar resins to obtain the linoleum cement.

Since the production of "scrim oil" is time-consuming, the art has developed what is known as "mechanical oil" which is obtained by heating a drying oil containing driers in a vessel provided with a suitable agitating mechanism, advantageously a system of paddles, and blowing air or an oxygen-containing gas through the heated oil while agitating the oil. This "mechanical oil" may then be mixed with a resin to obtain the linoleum cement.

Many methods of manufacturing linoleum have been practiced in which the product resulting from the admixture of "scrim oil" with "mechanical oil" is employed as an ingredient of the cement. However, generally speaking, the methods followed at the present time employ a cement comprised substantially entirely, if not entirely, of "mechanical oil" in that the period of time required for the manufacture of cement in accordance with this method is much less than that required in the manufacture of a "scrim oil" cement.

In some methods, rosin is incorporated into the oil prior to and during the agitation thereof. This results in the formation of a siccative oil-resin gel which is employed as the cement. In other methods, rosin is mixed with the oil after it has been removed from the oxidizer. Generally speaking, it is advantageous to oxidize the oil in the presence of the rosin or equivalent resin as the resulting siccative oil-resin gel possesses particularly desirable properties from the point of view of the manufacture of linoleum.

Various modifications have been proposed in cement preparing methods. Some of these involve oxidizing the oil in the presence of resin and filler. However, such methods require careful control as there is a definite tendency toward charring of the filler particles with the result that the final product is unsuitable for use in the manufacture of light shades of floor covering.

Generally speaking, in the manufacture of linoleum, the cement is discharged from the oxidizer, while it is at elevated temperatures such as 260° F. to 300° F. and in a relatively fluid jelled or highly plastic state, into a cooling pit where the mass is cooled to a temperature such as 120° F. to 160° F. The mass is then cut into blocks and allowed to cool for approximately twenty-four hours to room temperature, at which time the cement is in the form of a soft gel. This gel-like mass of cement is then loaded into trucks for aging.

The cement is allowed to age for a considerable period of time such as ten to thirty days during which time it hardens to a tough plastic mass. The tough plastic mass of cement is then admixed with mineral and organic fillers, and pigments to obtain the linoleum mix which is then, after suitable treatment, calendered or otherwise impressed upon a backing to obtain the final product. Because of the solid state of the linoleum cement, it is difficult to obtain complete dispersion of pigments and fillers.

Efforts have been made to manufacture a finely divided material for use as a linoleum binder. However, these efforts involve kneading a mass of oxidized oil in the absence of other materials such as rosin. The final product is a crumblike mass of the oxidized oil. As pointed out above, it is less desirable for use in linoleum manufacture than the product obtained by oxidizing the oil in the presence of a resin such as rosin.

We have found that finely divided linoleum cement may be prepared by a process which includes forming a siccative oil-resin gel by the conventional method of heating and oxidizing a siccative oil in the presence of the resin and thereafter adding the highly plastic siccative oil-resin gel to a mass of chilled finely divided material such as the fillers commonly employed in linoleum manufacture. Agitation of the resulting mixture while maintaining a controlled low temperature on the mixer results in a finely divided linoleum cement which is comprised of agglomerates of beaded particles of cement.

While we do not intend to be limited by any theories expressed herein, it is believed that the chilled filler material acting in cooperation with the agitator and the low temperature of the mixer chills the siccative oil-resin gel and causes it to bead into small particles. The insulating power of the wood flour or other filler prevents these particles from combining together into a large mass.

The finely divided cement of our invention offers several advantages over the solid cements generally employed in linoleum manufacture. One advantage is that because of the particle size of our cement, it ages much more rapidly due to the larger surface which may be exposed to air.

Another advantage of the cement of our invention is that this cement is characterized by a much lighter shade than those cements previously employed in linoleum manufacture, thereby reducing the amount of pigment required to produce various shades of linoleum. Linoleum manufactured from the cement of our invention is also characterized by an improved face and also improved wearing properties. The product is also more flexible.

Still another advantage to be gained from the practice of our invention is that the finely divided linoleum cement readily lends itself to a continuous process of making linoleum.

In a particularly advantageous embodiment of our invention, a siccative oil, which may be a drying oil such as linseed oil, tung oil, and the like or which may be a semi-drying oil such as soya bean oil and the like, is oxidized and polymerized in the presence of a resin which is advantageously rosin, but which may be any other resinous material commonly employed in the manufacture of linoleum such as kauri gum, ester gum, and the like. As used herein, the term "siccative oil" or its equivalent is intended to include not only drying oils such as linseed oil, but also semi-drying oils such as soya bean oil. In addition, these oils may contain fatty acids which are split therefrom and, therefore, the expression "siccative oil" includes not only the oils indicated above, but also fatty acids obtained therefrom since the oxidation reaction with fatty acids is similar to that with the oils. The term "resin," as employed herein, is intended to include resins as well as resin acids such as abietic acid, pimaric acid, and the like can be employed in the production of linoleum cements.

After the siccative oil-resin gel is formed by a conventional method which involves heating the oil in the presence of resin at a temperature from about 180° F. to about 230° F. for a period of time from about 20 to about 30 hours, the resulting highly plastic siccative oil-resin gel is discharged from the oxidizer and immediately added while hot to a mass of filler particles such as wood flour which is chilled and which is contained in a vessel provided with a suitable agitator.

We have found that in order to produce a finely divided cement it is necessary that the wood flour be chilled to a low temperature and it is necessary to maintain such a low temperature on the mixer during agitation of the gel-filler mixture. This temperature may vary somewhat depending, among other things, upon the particular cement, the particular filler, the type of mixer and the like. Generally speaking, the temperature should be below about 35° F. We have obtained advantageous results by chilling the filler to a temperature below about 20° F. It is particularly advantageous to agitate the siccative oil-resin gel in the presence of filler which has been chilled to a temperature of about 0° F. to about 20° F. and to maintain the vessel containing gel-filler mixture within such a temperature range. The maintenance of such low temperatures may be accomplished by any means known to the art such as providing the vessel with a suitable jacket through which can be passed brine or other cooling fluids. It is also desirable to provide for the circulation of cooling fluid through the ports of the agitator. The mass of filler and siccative oil-resin gel is subjected to agitation for a period of time sufficient to obtain an intimate mixture of filler and cement or binder. This period of time varies depending, among other things, upon the particular composition of the siccative oil-resin gel, the particular filler employed, its particle size, and the like. Generally speaking, the desired finely divided cement is obtained after agitation for about ½ to ¾ hours. One method of determining the time of agitation is that involving the temperature of the mass within the vessel. When the temperature of the mass is lowered to at least about 100° F., it may be removed from the mixer. This is of importance as, when the mass of finely divided particles is above approximately about 100° F., extreme caution must be exercised in its removal and during aging to prevent combustion of the finely divided cement.

In order that the type of cement produced in accordance with our invention may be more readily understood, reference may be had to the accompanying illustrations which are reproductions of photographs of a mass of finely divided cement made in accordance with our invention.

Figure 1 is a reproduction of a photograph of the actual size of the finely divided cement and clearly shows that the cement is in the form of agglomerates.

Figure 2:
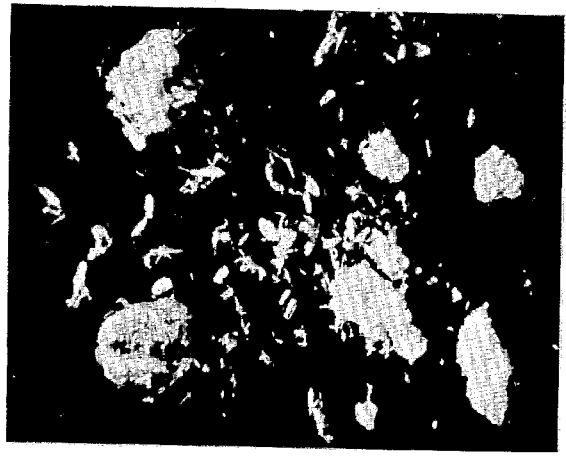

Figure 2 is a reproduction of a photograph of a portion of the cement shown in Figure 1, which reproduction is magnified twenty times. Reference to Figure 2 will show that the individual agglomerates are comprised of an intimate mixture of filler and beaded cement particles. In such a cement the bulk comprises individual agglomerates including a plurality of beaded particles of the siccative oil-resin gel coated with individual particles of filler.

Because of the nature of the cement produced in accordance with our invention, it is possible to manufacture linoleum utilizing a continuous process including a continuous mixing process. Continuous mixing has been long desired in linoleum manufacture, but because of the nature of conventional linoleum cements, the equipment necessary to carry out such a process has been such as to make the process commercially unattractive. However, when utilizing cements prepared in accordance with our invention, a continuous mixing method may be employed which includes continuously feeding the finely divided nonsticky particles prepared in accordance with our invention into a blender while continuously feeding the remainder of the linoleum formula. After a suitable period of mixing, a uniform, non-sticky mixture of linoleum composition is obtained which may then be processed in a series of internal mixers to obtain uniform dispersion. After obtaining the uniformly dispersed linoleum composition, the resulting mix may be disposed upon a backing and calendered or otherwise impressed to produce the product known as linoleum, which may then be stoved in a conventional manner to obtain a floor or wall covering.

Although we have described an advantageous embodiment of our invention, various modifications in the procedure set forth herein may be made. For example, other organic filler material such as cork particles may be employed in place of wood flour in the practice of our invention. If desired, mineral filler such as asbestos fibers may be used or mixtures of mineral and organic filler may be employed. Generally speaking, it is desirable to utilize all of the organic filler which is to be used in the linoleum mix in the production of the cement in accordance with our invention; thus, it is advantageous to add all of the wood flour, for example, to be used in a given formulation to the mixer to be chilled before addition of the siccative oil-resin gel. However, if desired, a portion of the filler may be added in order to enable the production of a finely divided linoleum cement, and the remainder may be added with the remaining dry ingredients of the linoleum mass. This procedure is advantageous in certain instances wherein a given batch of cement is to be employed in the production of various shades of linoleum as the amount of filler may vary depending upon the color of the final product. Thus, under such conditions, the amount of filler added to the mixer is such that the filler-siccative oil-resin gel ratio is equal to that employed in the particular cement in the particular linoleum composition utilizing the least amount of filler. When other colors are to be manufactured, the balance of the required filler may be added with the other ingredients necessary to produce the desired formulation.

As pointed out above, it is particularly advantageous to add the siccative oil-resin gel immediately after its removal from the oxidizer and while it is in a highly plastic condition and at an elevated temperature. However, if desired, the gel may be cooled and stored and, immediately prior to the addition of the gel to the mixer containing chilled filler, the gel may be heated to a highly plastic condition.

While the finely divided cement produced in accordance with our invention may be used in the formulation of a linoleum mass after a short aging period which is, generally speaking, approximately ¼ of the length of time required to age conventional cements, if desired, the finely divided mass may be further subdivided in conventional equipment such as a micro-pulverizer.

While the invention has been described with reference to certain specific examples and with reference to certain particular embodiments, it is to be understood that the invention is not limited thereby. Therefore, changes, omissions, substitutions and/or additions may be made without departing from the spirit of the invention as defined in the appended claims which are intended to be limited only as required by the prior art.

We claim:

1. A continuous method of making linoleum which comprises forming a finely divided linoleum cement comprised of beaded particles of siccative oil-resin gel and finely divided filler by admixing hot siccative oil-resin gel with finely divided filler at a temperature below 35° F., continuously adding said finely divided mass to a vessel while continuously adding the remaining dry ingredients of the linoleum composition, intimately mixing the resulting mixture, and shaping the resulting mixture into a sheet.

2. A method of making finely divided linoleum cement comprising oxidizing a siccative oil in the presence of resin and in the absence of filler particles at a temperature between about 260° F. and about 300° F. to produce a highly plastic mass of siccative oil-resin gel, adding said gel to a mass of filler particles and agitating said gel in the presence of said filler particles while maintaining an ambient temperature below about 35° F.

3. A method of making finely divided linoleum cement comprising oxidizing a siccative oil in the presence of resin and in the absence of filler particles at a temperature between about 260° F. and about 300° F. to obtain a highly plastic mass of siccative oil-resin gel, adding said gel to a mass of filler particles which have been cooled to a temperature below about 20° F., and agitating the resulting mixture while maintaining a temperature sufficiently low to produce a mass of finely divided linoleum cement having a temperature below about 100° F.

4. A linoleum binder comprising a mass of finely divided agglomerates, the bulk of which comprises individual agglomerates including a plurality of beaded particles of a siccative oil-resin gel coated with individual particles of filler.

5. A method of making finely divided linoleum cement comprising oxidizing linseed oil in the presence of rosin at a temperature between about 260° F. and about 300° F. to obtain a highly plastic mass of linseed oil-rosin gel free from filler particles, adding said gel to a mass of filler particles which have been chilled to a temperature between about 0° F. and about 20° F., and agitating the resulting mixture while maintaining an ambient temperature between about 0° F. and about 20° F.

6. A method of making finely divided linoleum cement comprising oxidizing soya bean oil in the presence of rosin at a temperature between about 260° F. and about 300° F. to obtain a highly plastic mass of soya bean oil-rosin gel free from filler particles, adding said gel to a mass of filler particles which have been chilled to a temperature between about 0° F. and about 20° F., and agitating the resulting mixture while maintaining an ambient temperature between about 0° F. and about 20° F.

7. A method of making finely divided linoleum cement comprising forming a highly plastic mass of siccative oil-resin gel free from filler particles in an oxidation zone maintained at a temperature between about 260° F. and about 300° F., removing the resulting siccative oil gel from said oxidation zone and immediately thereafter charging the highly plastic gel to a mixing zone containing a mass of filler particles at a temperature below about 20° F., and agitating the resulting mixture while maintaining the temperature of said mixing zone below about 20° F.

8. A method of making a finely divided linoleum cement comprising oxidizing a siccative oil in the presence of a resin and in the absence of a filler at a temperature between about 260° F. and 300° F. to obtain a highly plastic mass of siccative oil-resin gel, adding said highly plastic mass to a mass of cork particles in a mixing zone, and agitating the resulting mixture while maintaining the temperature of the mixing zone below about 35° F.

9. A method of making a finely divided linoleum cement comprising oxidizing a siccative oil in the presence of a resin and in the absence of a filler at a temperature between about 260° F. and 300° F. to obtain a highly plastic mass of siccative oil-resin gel, adding said highly plastic mass to a mass of wood flour in a mixing zone, and agitating the resulting mixture while maintaining the temperature of the mixing zone below about 35° F.

10. A method of making a finely divided linoleum binder comprising oxidizing linseed oil in the presence of rosin and in the absence of filler particles at a temperature from about 260° F. to about 300° F. to obtain a highly plastic mass of linseed oil-rosin gel, adding said gel to a mass of wood flour at a temperature below about 20° F., and agitating said gel in the presence of said wood flour while maintaining an ambient temperature below about 20° F.

11. A method of making finely divided linoleum cement comprising oxidizing linseed oil in the presence of rosin at a temperature between about 260° F. and about 300° F. to obtain a highly plastic mass of linseed oil-rosin gel free from filler particles, removing said gel from said oxidizing zone, immediately charging said gel while at elevated temperature to a mixing zone containing a mass of wood flour particles at a temperature between about 0° F. and about 20° F., and agitating the resulting mixture of gel and wood flour while maintaining the temperature of the mixing zone below about 20° F. until an intimate mixture of wood flour and gel having a temperature below about 100° F. is obtained.

HENRY L. POWERS.
HAROLD A. REEHLING.

REFERENCES CITED

The following references are of record in the file of this patent:

UNITED STATES PATENTS

| Number | Name | Date |
| --- | --- | --- |
| 1,693,917 | Eisenstein | Dec. 4, 1928 |
| 2,224,238 | Spitzli et al. | Dec. 10, 1940 |